UNITED STATES PATENT OFFICE.

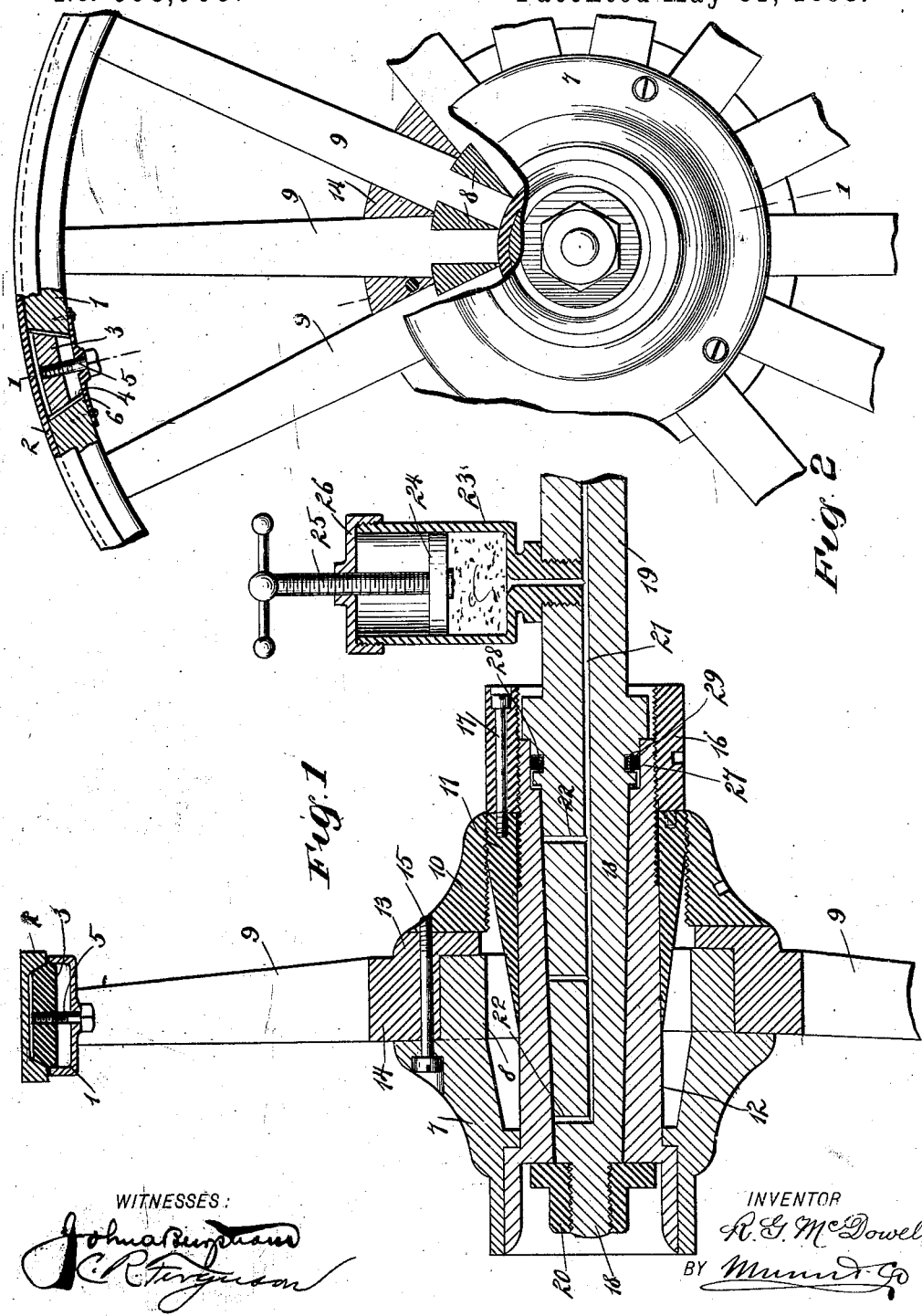

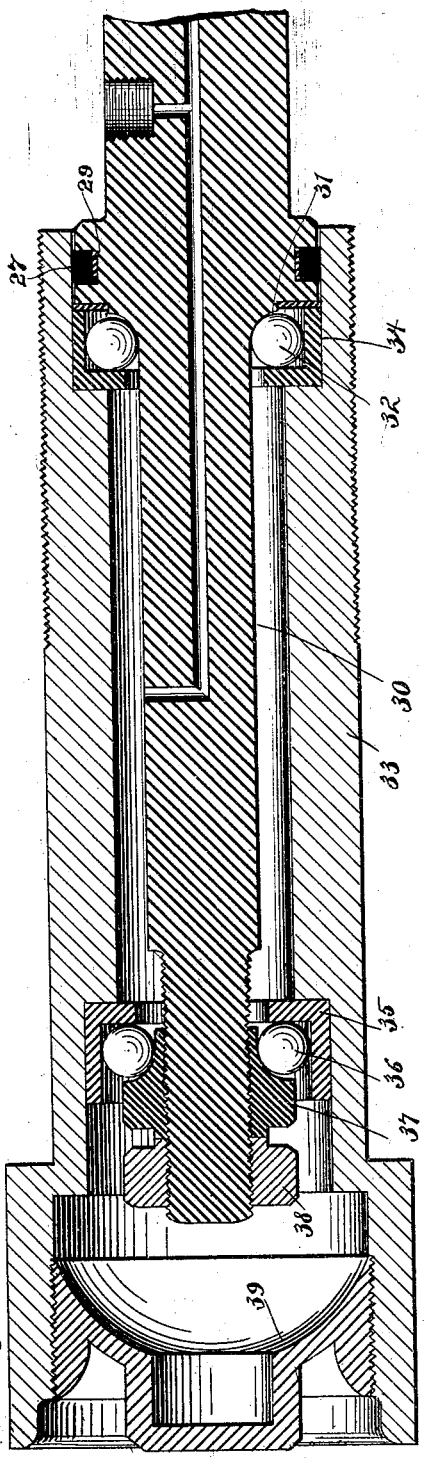

ROBERT G. McDOWELL, OF ANACONDA, MONTANA.

VEHICLE-WHEEL.

SPECIFICATION forming part of Letters Patent No. 605,003, dated May 31, 1898.

Application filed December 13, 1897. Serial No. 661,741. (No model.)

*To all whom it may concern:*

Be it known that I, ROBERT G. MCDOWELL, of Anaconda, in the county of Deer Lodge and State of Montana, have invented new and useful Improvements in Vehicle-Wheels, of which the following is a full, clear, and exact description.

This invention relates to wheels for vehicles; and the object is to provide a wheel of comparatively simple construction and in which the felly may be readily expanded to tighten it in the tire, and, further, to provide a strong hub of separable parts which may be quickly assembled and secured together.

I will describe a vehicle-wheel embodying my invention, and then point out the novel features in the appended claims.

Reference is to be had to the accompanying drawings, forming a part of this specification, in which similar characters of reference indicate corresponding parts in all the views.

Figure 1 is a section on the line 1 1 of Fig. 2, showing a wheel embodying my invention. Fig. 2 is a partial section and partial elevation of the same, and Fig. 3 is a longitudinal section showing a modification of the spindle-box.

Secured on the felly 1 of the wheel is the tire 2, and in this felly I have provided means for expanding it circumferentially. As here shown, this means consists of a block 3, substantially wedge shape or having inclined ends engaging against the correspondingly-inclined ends of the felly. The inclined ends of the felly may be provided with bearing-plates 4. From the block 3 a screw 5 extends through a plate 6 on the inner periphery of the felly. Obviously by rotating the screw 5 the block 3 will be drawn inward or toward the axis of the wheel and cause the felly to expand. There may be any desired number of expanding devices used in a wheel; but it is obvious that one will answer all practical purposes.

The hub of the wheel consists of a front ring-like section 7, having inward projections 8, which are wedge-shaped and designed to be engaged between tenons of the spokes 9, and the inner portion of the hub consists of a ring 10, having an interior screw-thread engaging with the screw-thread of a tapering sleeve 11, movable on the box 12. Arranged between the parts 7 and 10 of the hub is a ring 13, having wedge-shaped projections 14 extended between the hubs at the outer side of the projections 8. These parts 7, 10, and 14 may be secured together by screw-bolts 15. The spaces between the projections 8 of the front ring-like portion 7 of the hub form the sockets for the tenons of the spokes, and the ends of these tenons are beveled and engage upon the sleeve 11. Therefore it is obvious that when this wedge-like sleeve 11 is forced inward the spokes will be forced outward to tighten them against the felly. An interiorly-threaded ring 16 engages with the thread of the box 12 and abuts against the sleeve 11. This ring 16 will serve as a jam-nut to hold the sleeve 11 in place or to prevent its accidental loosening. As a further means to secure the parts together screw-bolts 17 may be passed through longitudinally-extended holes in the ring 16 and engage in tapped holes in the end of the sleeve 11. The opening through the box 12 is longitudinally tapered, the greatest diameter being at the inner end, and engaged in this tapered opening is the spindle 18 of the axle 19. The outer end of the spindle 18 is screw-threaded, and on this threaded portion is the wheel-nut 20. The spindle 18 has a longitudinal channel 21, from which branch channels 22 extend laterally and through the spindle.

An oil-cup 23 is mounted on the axle 19 and has communication with the channel 21, and as it is desired to have the lubricant in the oil-cup 23 under pressure I employ a piston 24 in the cup, having a screw-threaded stem 25 engaging in a tapped hole in the cover 26. To prevent the entrance of dirt and dust to the spindle, I employ a washer 27 of flexible material—such, for instance, as leather. This washer is seated in an annular channel 28, made in the spindle 18, and it may be pressed yieldingly outward by means of a spring-ring 29.

In Fig. 3 I have shown how ball-bearings may be employed between the spindle and the box. In this example the spindle 30 has at its inner end a shoulder 31, forming a raceway for ball-bearings 32, and arranged in the box 33 is a ring-shaped raceway 34, in which the balls 32 also engage. At the forward end the box has a ring-shaped raceway 35 for the ball-bearing 36, and engaging with the threaded portion of the spindle 30 is a nut 37, having a raceway for the balls 36. A jam-nut 38 is engaged with the threaded portion of the spindle and abuts against the raceway-nut 37. The enlarged outer end of the box 33 has an interior screw-thread with which the exterior screw-thread of the cap 39 engages. This cap is designed to prevent the entrance of dust to the bearings and also to prevent the escape of oil that flows in through the channel formed in the spindle. A hub like the one shown and described in Fig. 1 is to be used in connection with this box 33, and it will also have the wedge-shaped sleeve 11 and the oil-cup.

While I have described this invention as particularly adapted for a vehicle-wheel, it is obvious that it may be otherwise employed—that is, for pulleys or band-wheels. Therefore I do not limit the invention to vehicle-wheels.

It will be noted that the tire 2 has side flanges that engage with the periphery of the felly.

Having thus described my invention, I claim as new and desire to secure by Letters Patent—

1. A wheel-hub, comprising a front ring-like portion having inwardly-extending wedge-shaped projections to engage between spokes, a ring having forwardly-extended wedge-shaped projections to engage between spokes at the outer side of the first-named projections, a ring-shaped inner portion for the hub, means for securing the two sections of the hub together, a box, a tapered sleeve having an exterior screw-thread engaging with an interior screw-thread of the inner section of the hub, and means for securing said sleeve to the box, substantially as specified.

2. In a wheel, a hub, comprising inner and outer ring-shaped sections, means for securing the two sections together, a box, a tapered sleeve movable on said box for forcing the wheel-spokes outward, the said tapered sleeve having screw-thread engagement with the inner section of the hub, and a ring having a screw-thread engagement with the box and engaging against the end of the sleeve, substantially as specified.

3. A wheel-hub, comprising front and rear ring-like sections, the said sections having wedge-shaped projections to engage the sides of spokes, means for securing the sections together, a box, a tapered sleeve movable on the box to force spokes outward, and means for holding said sleeve in position, substantially as specified.

ROBERT G. McDOWELL.

Witnesses:
CHARLES HOUCK,
EDWARD J. BLACKWELL.